(12) United States Patent
Moubayed et al.

(10) Patent No.: US 11,475,480 B2
(45) Date of Patent: Oct. 18, 2022

(54) SYSTEM FOR IMPROVED DIGITAL ADVERTISING DISPLAY DEVICE PROOF-OF-PLAY DATA LOGGING

(71) Applicant: A.C.N. 629 573 093 PTY. LTD., Sydney (AU)

(72) Inventors: Mohamad Moubayed, Sydney (AU); Cheng Xin Yang, Sydney (AU); Chee Sun Choong, Sydney (AU)

(73) Assignee: A.C.N. 629 573 093 PTY. LTD., Sydney (AU)

( * ) Notice: Subject to any disclaimer, the term of this patent is extended or adjusted under 35 U.S.C. 154(b) by 287 days.

(21) Appl. No.: 16/758,818

(22) PCT Filed: Oct. 24, 2018

(86) PCT No.: PCT/AU2018/051150
§ 371 (c)(1),
(2) Date: Apr. 23, 2020

(87) PCT Pub. No.: WO2019/079853
PCT Pub. Date: May 2, 2019

(65) Prior Publication Data
US 2020/0327578 A1    Oct. 15, 2020

(30) Foreign Application Priority Data
Oct. 24, 2017    (AU) ................................. 2017904300

(51) Int. Cl.
*G06Q 30/02* (2012.01)
*G06F 16/958* (2019.01)
(Continued)

(52) U.S. Cl.
CPC ......... *G06Q 30/0248* (2013.01); *G06F 9/542* (2013.01); *G06F 16/986* (2019.01);
(Continued)

(58) Field of Classification Search
CPC ........... G06Q 30/0248; G06Q 30/0272; G06Q 90/00; G06Q 30/00;
(Continued)

(56) References Cited

U.S. PATENT DOCUMENTS 7,188,353 B1    3/2007 Crinon
8,301,645 B1 *  10/2012 Crook ..................... G06F 16/20
                                                    709/219
(Continued)

FOREIGN PATENT DOCUMENTS

CN        106911434 B   *  2/2017

OTHER PUBLICATIONS

Supplementary European Search Report dated Jun. 18, 2021 from European Application No. 18869633.0.
(Continued)

*Primary Examiner* — Thuy N Nguyen
(74) *Attorney, Agent, or Firm* — Innovation Capital Law Group, LLP; Vic Lin

(57) ABSTRACT

There is provided herein a technical solution to the technical problem of being able to obtain proof-of-play and display timing data despite not being able to access or modify the display controller software of digital display devices of outdoor advertising networks which entails transmitting hypertext marked-up image display data files to digital displays which comprise client-side code and a resource locator. As such, when each display data file is displayed by the digital display the web-capable display controller thereof executes the client-side code to transmit proof-of-play tracking data to the resource locator and which may periodically transmit timing data until the instantiation of the client-side code is destroyed by the display controller. Aspects are also provided herein for being able to achieve sub second resolution and account for data transmission errors.

22 Claims, 6 Drawing Sheets

(51) Int. Cl.
*G06F 9/54* (2006.01)
*G09G 5/36* (2006.01)
*G09G 5/38* (2006.01)
*H04L 9/32* (2006.01)

(52) U.S. Cl.
CPC ......... *G06Q 30/0272* (2013.01); *G09G 5/363* (2013.01); *G09G 5/38* (2013.01); *H04L 9/3239* (2013.01); *G09G 2354/00* (2013.01)

(58) Field of Classification Search
CPC . G06Q 30/0207–30/0277; G06F 9/542; G06F 16/986; G06F 13/00; G09G 5/363; G09G 5/38; G09G 2354/00; H04L 9/3239; H04L 9/32
See application file for complete search history.

(56) References Cited

U.S. PATENT DOCUMENTS

| | | | | |
|---|---|---|---|---|
| 8,477,193 | B1* | 7/2013 | Rozenboim | G07F 17/32 348/143 |
| 9,484,002 | B2* | 11/2016 | SanGiovanni | G06Q 30/0241 |
| 9,553,918 | B1* | 1/2017 | Manion | G06F 16/40 |
| 9,865,005 | B1* | 1/2018 | Pottjegort | G06Q 30/0242 |
| 10,614,481 | B1* | 4/2020 | Haarstick | G06Q 30/0242 |
| 10,748,179 | B1* | 8/2020 | Zdarko | G06Q 30/0249 |
| 11,068,931 | B1* | 7/2021 | Luttrell | G06Q 30/0242 |
| 2002/0077896 | A1* | 6/2002 | Liu | G06Q 10/0637 705/14.66 |
| 2002/0087403 | A1* | 7/2002 | Meyers | H04N 21/235 705/14.69 |
| 2009/0144157 | A1 | 6/2009 | Saracino et al. | |
| 2009/0158136 | A1* | 6/2009 | Rossano | H04N 7/147 715/810 |
| 2009/0265243 | A1* | 10/2009 | Karassner | G06Q 30/0275 705/14.54 |
| 2010/0223114 | A1* | 9/2010 | Yao | G06Q 30/02 705/30 |
| 2011/0029384 | A1* | 2/2011 | Wei | G06F 16/951 707/E17.108 |
| 2011/0082754 | A1* | 4/2011 | Shuster | G06Q 30/0225 705/14.68 |
| 2013/0018719 | A1* | 1/2013 | Abraham | G06Q 30/0242 705/14.41 |
| 2013/0110607 | A1* | 5/2013 | Basmajian | G06Q 30/0234 705/14.26 |
| 2013/0132170 | A1* | 5/2013 | Yelisetti | G06Q 30/02 705/14.4 |
| 2014/0067550 | A1* | 3/2014 | Chang | G06Q 30/0277 705/14.68 |
| 2014/0122248 | A1* | 5/2014 | Kuzama | G06Q 30/0269 705/14.66 |
| 2014/0244406 | A1* | 8/2014 | Garcia-Martinez | G06Q 30/0277 705/14.73 |
| 2014/0304591 | A1* | 10/2014 | Yamamoto | G06F 40/143 715/234 |
| 2014/0316866 | A1* | 10/2014 | Rosen | G06Q 30/0277 705/14.6 |
| 2015/0026308 | A1* | 1/2015 | MacTiernan | H04N 21/8456 709/219 |
| 2015/0128157 | A1* | 5/2015 | Hardie | H04N 21/4126 725/5 |
| 2015/0220941 | A1* | 8/2015 | Tamir | G06Q 30/0201 705/7.29 |
| 2015/0310484 | A1* | 10/2015 | Haile | G06Q 30/0246 705/14.45 |
| 2015/0356999 | A1* | 12/2015 | Hassan | H04N 21/858 386/241 |
| 2016/0027040 | A1* | 1/2016 | Clemente Filho | G06Q 10/067 705/14.45 |
| 2016/0379279 | A1* | 12/2016 | Ashery | G06Q 30/0277 705/14.72 |
| 2017/0070476 | A1 | 3/2017 | Massoudi | |
| 2017/0076321 | A1* | 3/2017 | Reznek | G06Q 30/0246 |
| 2017/0140437 | A1* | 5/2017 | Bhat | H04L 67/2804 |
| 2018/0052851 | A1* | 2/2018 | Lewis | H04N 21/4532 |
| 2019/0034981 | A1* | 1/2019 | Basra | H04L 67/125 |
| 2019/0080360 | A1* | 3/2019 | Pan | G06Q 30/0277 |
| 2020/0234328 | A1* | 7/2020 | Haarstick | G06Q 30/0242 |

OTHER PUBLICATIONS

International Search Report dated Jan. 29, 2019 from PCT Application No. PCT/AU2018/051150.

* cited by examiner

SYSTEM FOR IMPROVED DIGITAL ADVERTISING DISPLAY DEVICE PROOF-OF-PLAY DATA LOGGING

FIELD OF THE INVENTION

This invention relates generally to proof-of-play and display timing data logging of digital advertising displays.

BACKGROUND OF THE INVENTION

Obtaining accurate digital advertising display device proof-of-play and display timing data is difficult.

Prior art advertising systems include US 2009/0144157 A1 (SARACINO et al.) 4 Jun. 2009 [hereinafter referred to as D1] and US 2002/0077896 A1 (LIU et al.) 20 Jun. 2002 [hereinafter referred to as D2] which use a central server to log proof-of-play statistics transmitted by electronic display devices operably coupled thereto.

However, a technical problem of systems such as D1 and D2 is that it is generally not possible to access and/or reconfigure the software and/or hardware of the central server or the digital displays for proof-of-play tracking in the manner described by D1 or D2.

As such, a need therefore exists for a technical solution to obtain proof-of-play and display timing data from digital displays of prior art advertising systems without having to access or modify the display controller software of the electronic displays thereof.

Ideally, it would also be possible to obtain millisecond resolution display timing data therefrom despite longer period network latencies and also to account for network data loss, not atypical of wireless data networks typically used for these types of electronic displays.

It is to be understood that, if any prior art information is referred to herein, such reference does not constitute an admission that the information forms part of the common general knowledge in the art, in Australia or any other country.

SUMMARY OF THE DISCLOSURE

There is provided herein a technical solution to the technical problem of being able to obtain proof-of-play and display timing data despite not being able to modify the display controller software of digital display devices of outdoor advertising networks.

The technical solution disclosed herein is based on many display controllers of outdoor electronic display systems being web capable in that they include a hypertext processor and client-side code interpreter capabilities. However, these display controllers are typically used only for rendering image and video files such as .jpg, .png, .gif, .mp4 files.

Specifically, these electronic display systems may each comprise a processor and a digital display device and memory device operably coupled thereto. The processor executes a display controller for loading a series of image data files from the memory device in turn for sequential display thereof on the digital display device.

The technical solution provided herein is to provide a hypertext marked-up image display data file for storage within the memory of the electronic display system which is accessed in turn by the display controller for display thereof amongst the other conventional image and/or video data files.

The hypertext marked-up image display data file comprises image data, hypertext markup therefor, client-side code and a resource locator. As such, when the web capable display controller accesses the hypertext marked-up image display data file, the hypertext processor thereof renders the HTML markup thereof as a web page. The HTML markup includes an image element for the image data file such that the image or video is displayed on the digital display device in a substantially no visually different manner to usual.

However, when the hypertext marked-up image display data file is rendered, the interpreter of the display controller interprets the associated client-side code. The client-side code causes the display controller to transmit proof of play data to third party tracking server for logging purposes.

Specifically, the client-side code may comprise an onload event handler which handles an onload event which is fired by the interpreter upon-loading the client-side code.

The onload event handler may call an asynchronous data transmitter function which may transmit data to the tracking server for proof-of-play logging.

The client-side code may further initiate a timer which may cause the periodic transmission of display timing data to the tracking server for display time logging. Periodic receipt of these subsequent transitions may be used for additionally recording the duration of display of the image data file.

When the display controller moves to the next image file in turn, the instantiation of the client-side code is destroyed such that the periodic transmissions terminate, thereby being indicative of the image data file no longer being displayed which may be used for timing duration calculation purposes.

The data transmissions of the client-side code overcomes image caching issues of image data hosted by a third-party server which may be only retrieved once from the third party server by the display controller and subsequently retrieved from a cache therefore, thereby not be suitable for proof of play or display timing purposes.

In embodiments, the client-side code is configured for sub second (such as millisecond) display timing resolution. In this regard, the client-side code may be configured for storing timing data within local storage (such as cookie or HTML 5 local storage) so as to persist across display sessions of the hypertext marked-up image display data file. As such, if the instantiation is destroyed by the display controller prior the periodic transmission of the time data, the timing data may be subsequently retrieved during the next display session for transmission to the tracking server. This technique overcomes technical problems of network latency and bandwidth wherein, for example, it may only be possible to make network transmissions once every second at best, especially across a wireless GSM data networks.

In embodiments, the client-side code may be further configured for network data loss wherein the client-side code is configured for storing timing data within local storage and listening for an acknowledgment data response from the server indicative of the transmission and successful receipt of the timing data thereto. Upon receiving the acknowledgment data response, client-side code may be configured for purging the local storage. Conversely, if the acknowledgment data response is not received, the timing data remains within local storage which may be subsequently transmitted. Unique transmission IDs may be generated and persisted across sessions using local storage by the client-side code so as to allow the server to discriminate between duplicative transmissions of timing data.

When retrieving prior session timing data from local storage, the client-side code may further be configured for eliminating the need for a separate data transmission therefor by adding the prior session timing data to the next periodic timing data transmission.

In embodiments, the client-side code may obtain additional parameters from the display controller such as location and screen properties which may be used for logging the display location and type of display of the image data files.

Furthermore, whereas it would be ideal to be able to uniquely identify each electronic display system individually, using the present technique it is generally not possible to modify the display controller software thereof to transmit a unique ID of the digital display to the server. As such, in embodiments, client-side code may be configured for obtaining and transmitting various electronic display system parameters to the server including time zone, page, browser, screen and location properties of which the particular combination thereof may be used for uniquely identifying the particular electronic display system.

In accordance with one aspect, there is provided, a method of obtaining proof-of-play data from an electronic display system comprising a processor and a digital display device and memory device operably coupled thereto, the processor executing a display controller for loading a series of image data files from the memory device in turn for sequential display thereof on the digital display device, the method comprising sending a hypertext marked-up image display data file for storage by the electronic display system in the memory device amongst the image data files, the hypertext marked-up image display data file comprising image data, hypertext markup, client-side code and a resource locator and wherein the display controller comprises a hypertext processor and client-side code interpreter such that when the hypertext marked-up image display data file is loaded by the display controller, the interpreter thereof interprets the client-side code and transmits proof-of-play data to a resource across a wide area network specified by the resource locator.

The client-side code may include an on-load event handler for handling an on-load event fired by the interpreter and an asynchronous data transmitter and wherein the on-load event handler invokes the asynchronous data transmitter when handling the on-load event.

The client-side code may further comprise a timer and which invokes the asynchronous data transmitter at a periodic interval.

The periodic interval may be between 800 ms and 1200 ms.

The hypertext markup may include an image element referencing the image data and wherein the hypertext marked up data file may further comprise styling for configuring at least one of the display location, display sizing and display orientation of the image element.

The client-side code may be configured for transmitting an image ID of the image data.

The client-side code may be configured for file hashing the image data to obtain a unique hash thereof and transmitting the hash.

The file hashing comprises MD5 hashing.

The client-side code may be further configured for obtaining and transmitting timestamp data.

The client-side code may be further configured for obtaining and transmitting time zone properties including a time zone offset.

The client-side code may be configured for obtaining and transmitting browser properties.

The client-side code may be configured for obtaining screen properties of the digital display device and transmitting the screen properties.

The screen properties may comprise at least one of screen width, screen height, document width and document height.

The client-side code may be configured for obtaining and transmitting location properties.

The timer may be a sub second resolution timer and wherein the client-side code may be configured to record sub second timing data at a sub second timing interval within local storage of the display controller.

Local storage comprises at least one of cookie and HTML 5 local storage.

At a further timing interval greater than the sub second timing interval, the client-side code may be configured for transmitting timing data obtained from the local storage of the display controller.

The client-side code includes an on-load event handler for handling an on-load event fired by the interpreter and wherein, when handling the on-load event, the client-side code may be configured for inspecting local storage of the display controller for prior session timing data.

If prior session timing data may be located within local storage, the client-side code may be configured for transmitting the prior session timing data.

Transmitting the prior session timing data may comprise generating a transmission therefore.

Transmitting the prior session data may comprise adding the prior session timing data to a subsequent timing transmission.

The client-side code may be configured for storing timing data within local storage of the display controller and wherein, when the client-side code may be configured for receiving a transmission acknowledgment and clearing the timing data from local storage in response to receiving the transmission acknowledgment.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which.

DESCRIPTION OF EMBODIMENTS

Figure 1:
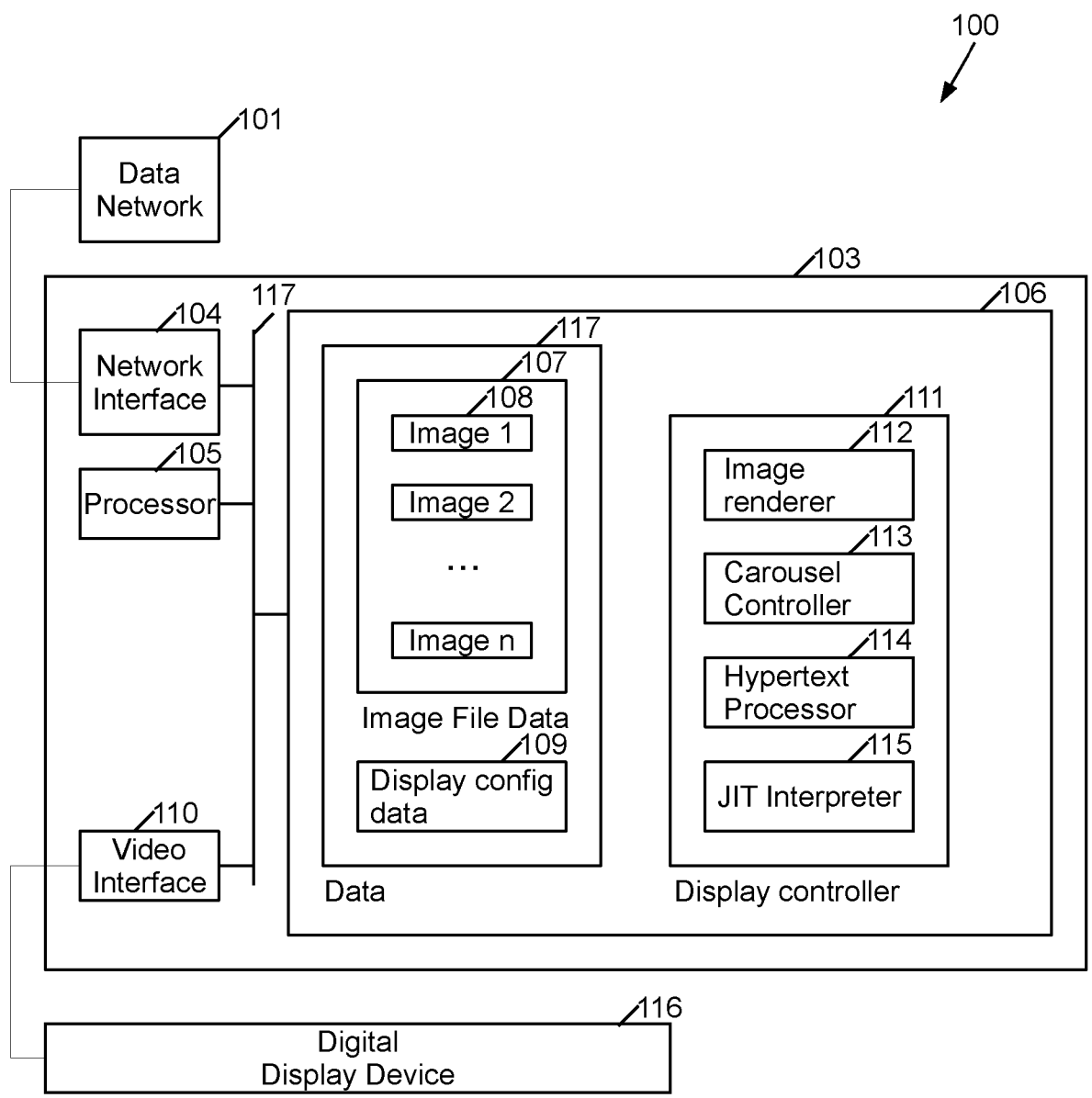
FIG. 1 shows a web capable electronic display system in accordance with an embodiment.

FIG. 1 shows an electronic display system 100. The electronic display system 100 comprises a computing device 103 having a processor 105 and a digital display device 116 a memory device 106 operably coupled thereto across a system bus 117. A video interface 110 may interface the processor 105 and the digital display device 116.

The memory device 106 may be configured with data 116 and computer program code instructions which are fetched, interpreted and executed by the processor 105 in use.

As shown, the computer broken code instructions may implement a display controller 111. Furthermore, the data 117 may comprise image file data 107 comprising a plurality of images 108. The image file data 107 may be loaded into the memory device 106 across a wide area data network 101 and network interface 104.

In use, the display controller 111 is executed by the processor 105 to load the image data files 118 in sequence from memory 106 for sequential display thereof on the digital display device 106.

It should be noted that the term "image data" and derivatives thereof as used herein include both image (such as image .jpg, .png, .gif data format and the like) and video data (.wav, .mp4 format and the like), and, in embodiments, audio data also.

The display controller 111 may comprise a carousel controller 113 configured to control the display the sequence, duration, time of day display and the like of the individual image data files 108 in accordance with display configuration data 109.

The display controller 111 may comprise an image renderer 112 for displaying the images or rendering the video files from the image data files 108.

The display controller 111 may further comprise a hypertext processor 114 for rendering hypertext markup using the digital display device 116. Furthermore, the display controller 111 may comprise a client-side code interpreter 115 for interpreting client-side code such as JavaScript and which may take the form of a just-in-time (JIT) client-side code interpreter.

Figure 2:
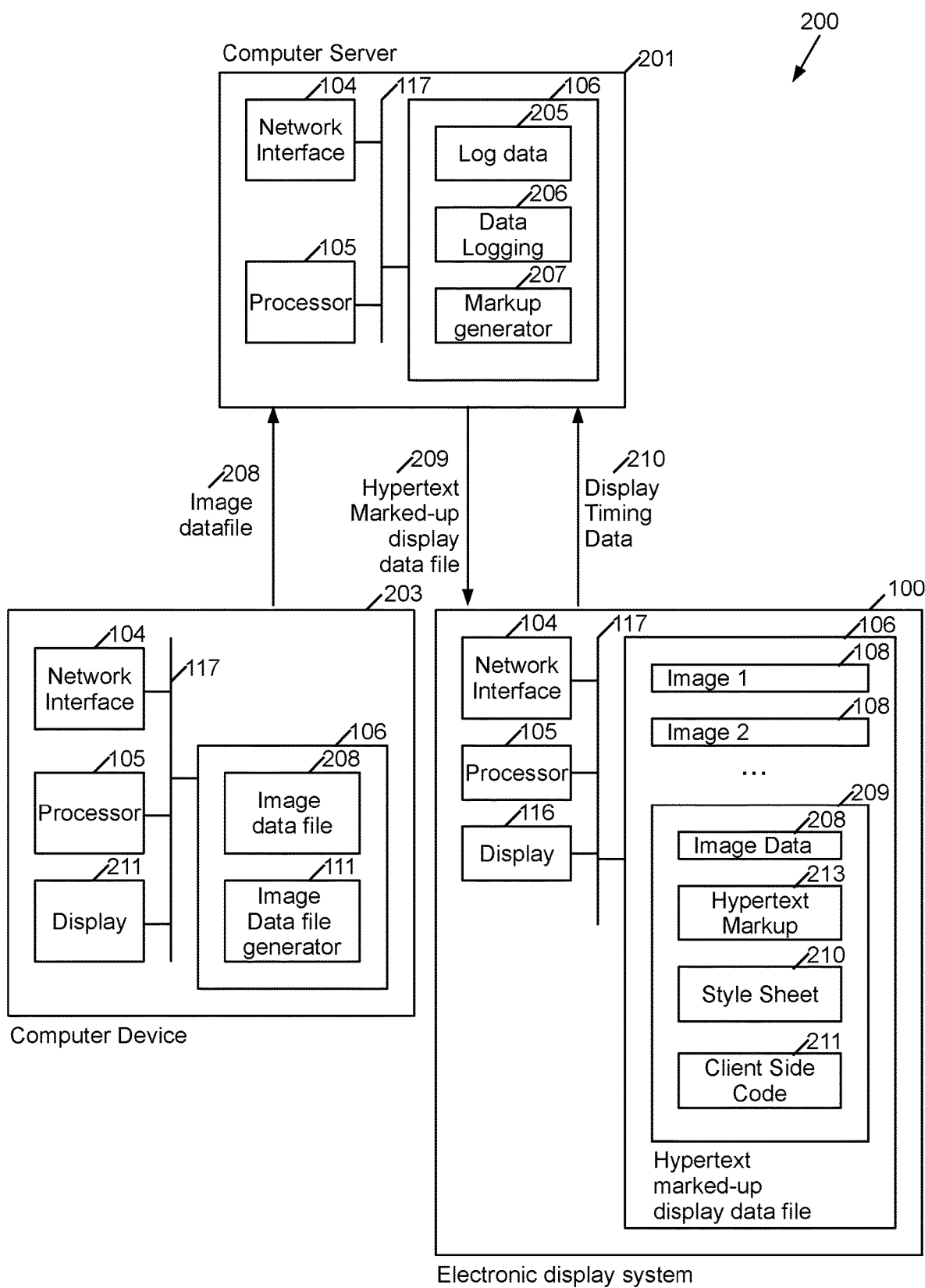
FIG. 2 shows a display system in accordance an embodiment.

The FIG. 2 shows the display system 200 comprising a computer device 203, computer server 201 and the electronic display device 100, each of which may comprise the aforedescribed processor 105, memory device 106, system bus 107 and network interface 104. The computer device 203 and the electronic display system 100 may comprise the digital display devices 211, 116.

The computer device 203 may be configured for generating an image data file 208 including using an image data file generator 111.

The computer device 203 may transmit the image data file 208 to the computer server 201 across the wide area data network 101.

Figure 3:
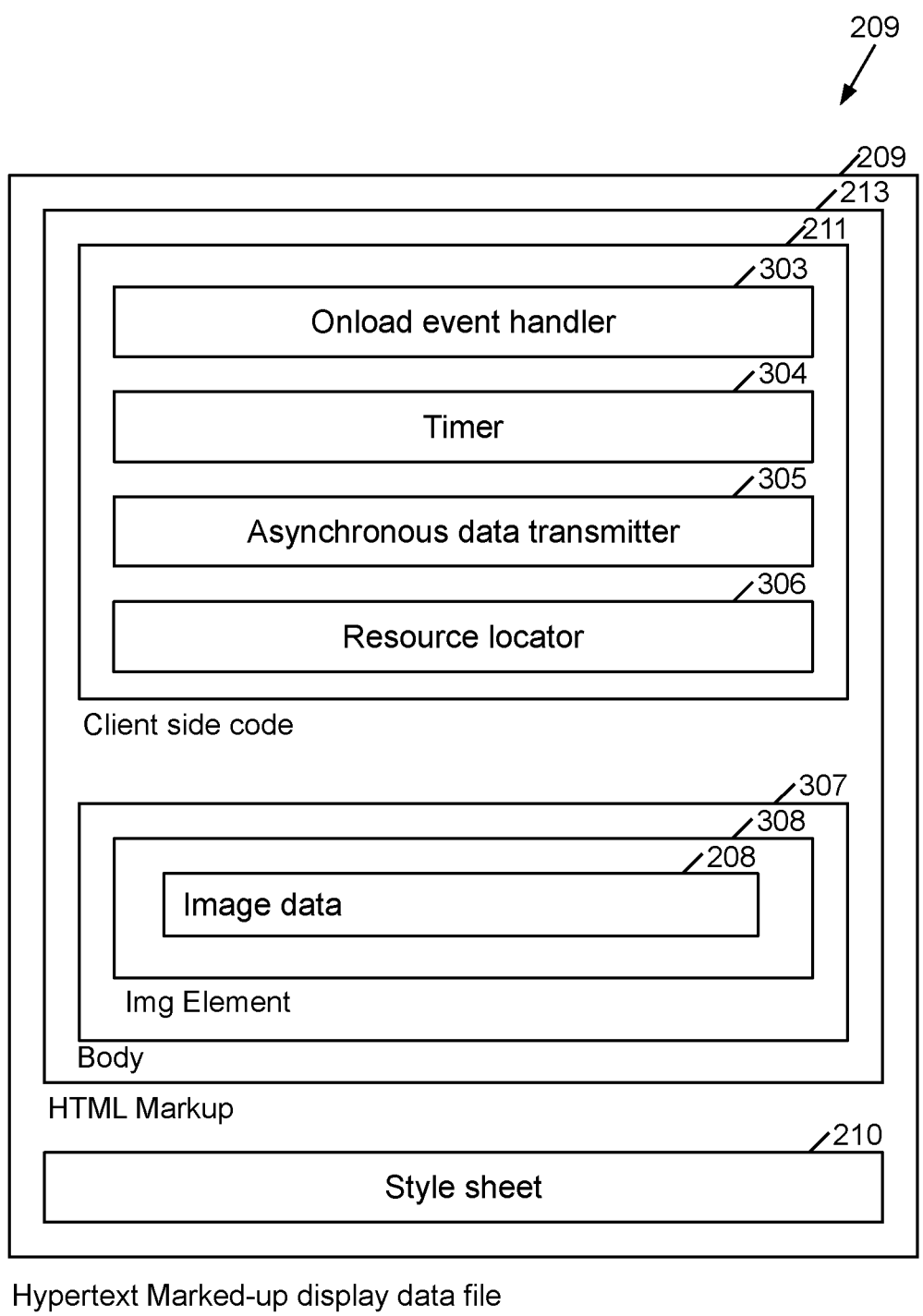
FIG. 3 shows a hypertext marked up display data file in accordance with an embodiment.

Upon receipt of the image data file 208, the computer server 201 may generate a hypertext marked-up image display data file 209 as a substantially provided in FIG. 3 using the image data file 208 received from the computer device 203.

The computer server 201 may transmit the hypertext marked-up image display data file 208 to the electronic display system 100 for storage within memory 106 thereof.

In alternative embodiments, the computer device 203 may generate the hypertext marked-up image display data file 209. Furthermore, in embodiments, the computer device 203 may transmit the hypertext marked-up display data 509 to the electronic display system 100 including via the wide area data network 101 or using a portable memory storage device.

The hypertext marked-up image display data file 209 may comprise image data file 208 or a derivatives thereof, hypertext markup 213 (such as HTML markup) and client-side code 211, preferably JavaScript.

In embodiments, the hypertext market data file 209 may further comprise a style sheet 211, such as a cascading style sheet (CSS) data file, for control of the rendering of the image data file 208 (such as the location, orientation and sizing of the image data file 208 on the digital display device 116). In embodiments as is shown in FIG. 3, the hypertext marked-up image display data file 209 may further comprise a resource locator 306 identifying a resource served by a Web server (not shown) of the computer server 201.

FIG. 3 illustrates the hypertext marked-up image display data file 209 further detail which is shown as comprising the aforedescribed HTML hypertext markup 213, client-side code 211, resource locator 306 and optional style sheet 211.

The hypertext marked-up image display data file 209 may be provided as a compressed archive comprising the image data 208, hypertext market 213, style sheet 211 and/or client-side code 211 compressed therein. Upon storage within the memory 106, or just-in-time when required for display, the compressed archive may be uncompressed into a folder of the memory device 106.

Alternatively, the hypertext marked-up image display data file 209 may be provided as an archived webpage (MIME HTML) incorporating these various elements.

The HTML markup 213 may comprise a body element 307 having an image element 308 therein referencing the image data file 208.

The hypertext marked-up image display data file 209 may further comprise the style sheet 210 which may be used to control the rendering of the image element 308, including the on-screen display location, on-screen orientation and on-screen sizing of the image rendered from the image data file 208.

The hypertext marked-up image display data file 209 may further comprise the client-side code 211 which may be included in-line or by reference within the HTML markup 213.

The client-side code 211 may comprise the resource locator 306 specifying a resource served by the Web server of the computer server 201. Typically, the resource locator 306 may take the form of a URL. The URL may comprise image data file 208 specific information, such as an image data file ID or the like. A unique ID may be generated for each image data file 208 so as to allow for the tracking thereof in the manner described herein. Alternatively, a unique ID may be generated using a hash algorithm, such as an MD5 hash or the like such that the associated image data file 208 may be identified therefrom without having to separately record unique IDs thereof.

As such, requests to the web resource served by the computer server 201 may be resolved across the data network 101 according to the resource locator which specifies the URL or IP address of the server 201 and wherein the resource locator may further comprise the unique ID of the image data file 208 or a hash thereof as a GET parameter so as to allow the server 201 to identify the relevant image data file 208 when receiving the request.

The client-side code 211 may implement and onload event handling 203 which fires and onload event when the hypertext marked-up image display data file 209 is rendered by the display controller 111.

The client-side code 211 may further implement a timer 304 which may be used for calculating display time or timing data transmissions in the manner described hereunder.

Furthermore, the client-side code 211 may comprise an asynchronous data transmitter function 305 such as one employing AJAX for making POST or GET asynchronous requests to the server 201.

Figure 4:
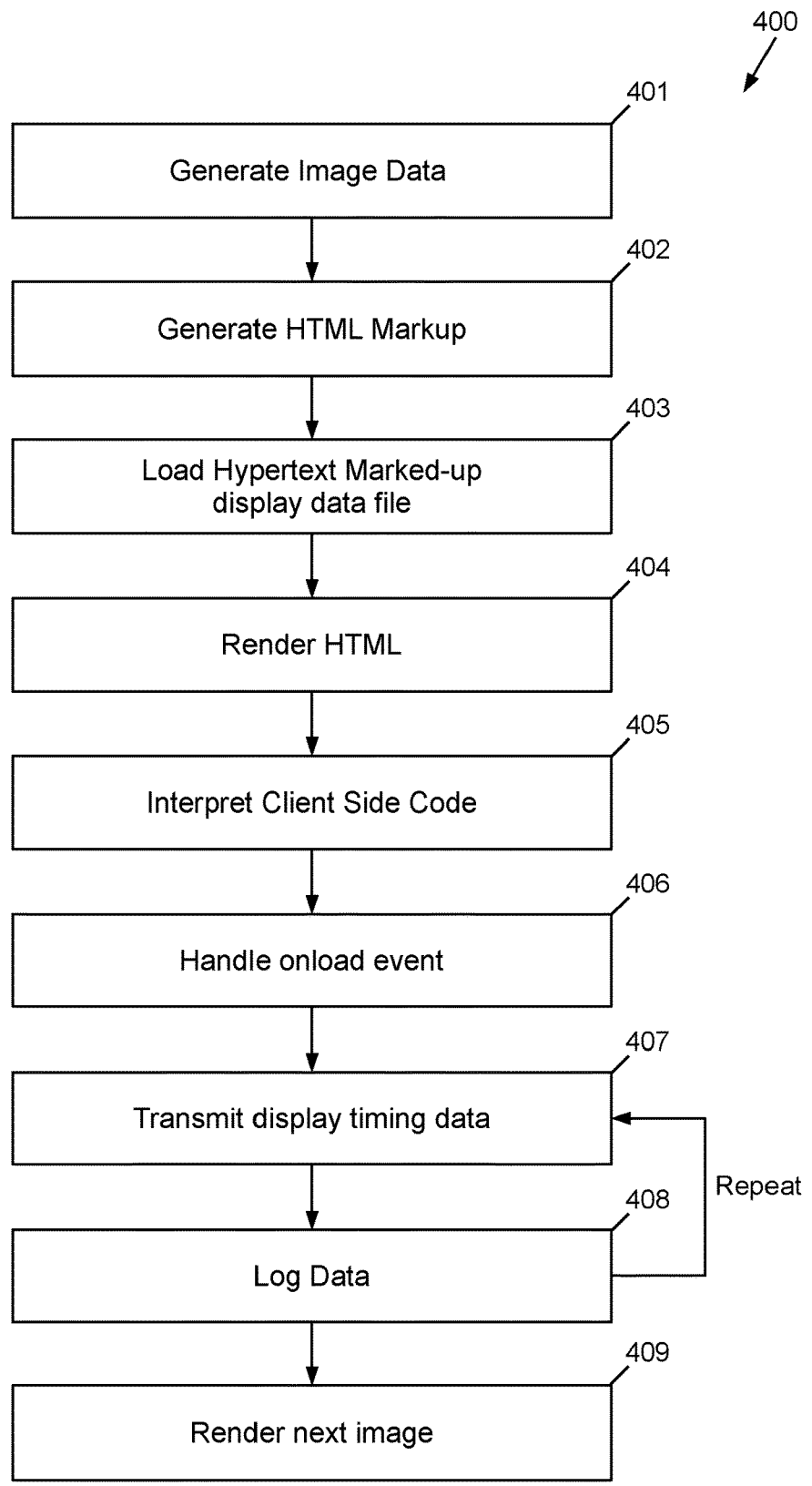
FIG. 4 illustrates proof of play and timing data processing by the present system in embodiments.

FIG. 4 illustrates exemplary processing 400 using the system 200.

The processing 400 may comprise the generation of the image data file 208 at step 401 which may comprise using the image data file generator 211 of the computer device 203.

Step 402 comprises the generation of the hypertext marked-up image display data file 209 using the image data file 208 which may comprise using the markup generator 207 of the computer server 201.

The markup generator 208 may generate the HTML markup 307 to embed the image data file 208 within the image element 308 thereof and may further configure the style sheet 208 to control the display of the image element 308 when rendered on the digital display device 116.

The market generator 207 may further configure the client-side code 213, including in generating a unique image data file ID which may be encoded within the resource locator 306 as a GET URL parameter of the client-side code 211.

The server 201 may keep a copy of the image data file which may be used for hash algorithm lookup for specific image data file identification as alluded to above.

The hypertext marked-up image display data file 106 is then loaded into the memory 106 of the electronic display system 100 along with other image data files 108.

The system 100 then operates in the usual manner wherein the display controller 111 loads the image data files 108 in turn for the sequential display of images using the digital display device 116, using the image renderer 112.

During the separation, the display controller 111 may load the hypertext image display data file 208 at step 403.

The hypertext processor 114 may then render the HTML 404 therein to display the associated image data file 208 on the digital display device 116. The hypertext processor 114 may use the style sheet 210 (if the style sheet 210 exists) to control the style of display of the image when rendered as outlined above.

Simultaneously, the JIT interpreter 115 loads and interprets the client-side code 211 of the hypertext markup display data file 209 at step 405 including in translating the client-side code into intermediate bytecode for execution.

Once the client-side code 211 is loaded by the JIT interpreter 115, the onload event handler 303 thereof may handle the fired load event at step 406.

The load event handler 303 may invoke the asynchronous data transmitter 305 to transmit data to the server 201 using the resource locator 306 at step 407. The computer server 201 may comprise a data logger 206 which may receive the asynchronous request from the asynchronous data transmitter 305 and which may log data accordingly within log data file 205.

In a preferred embodiment, the load event handler 303 invokes a timer 304, which, for example, may cause the data transmitter 305 to transmit the data at one second intervals to the computer server 201.

As alluded to above, each data transmission may comprise a unique ID of the image data file 208 or a hash derivatives thereof which may alternatively be used for uniquely identifying a particular image data file 208.

As such, when receiving the first data transmission from the data transmitter 305, the computer server 201 is able to ascertain that the image data file 208 was in fact displayed using the digital display device 116. The data logger 206 may record the image data file ID and date and time timestamp data thereof.

Each additional data transmission may then be used by logged by the server 201 at step 408 to infer the duration of the display of the image data file 208 to 1 second resolution.

The server 201 may be configured for distinguishing between iterative displays of the image data file 208 by allocating subsequent data transitions within a two second period as being in relation to the continuous display of the image data file 208 whereas further data transmissions outside this period are indicative of subsequent displays of the image data file 208.

In embodiments, the client-side code 211 may be configured for incrementing a display counter which may be transmitted by the transmitter 305 to the server 201 to distinguish between successive displays of image data file 208. The display counter may be stored within a cookie or HTML 5 local storage so as to persist between display sessions.

Additional information may also be transmitted and logged by the computer server 201. In embodiments, unique ID of the electronic display system 100 may be transmitted to the computer server 201 for recording. As it may not be possible to uniquely configure each electronic display system 100 with a unique ID, various system and browser properties may be gathered by the client-side code 211 which may be transmitted to the server 201, including the following JavaScript obtainable properties:

Timezone properties timeOpened:newDate( )
timezone:(newDate( )).getTimezoneOffset ( )/60
Page properties window.location.pathname
document.referrer
history.length
Browser properties navigator.appName
navigator.product
navigator.appVersion
navigator.userAgent
navigator.language
navigator.onLine
navigator.platform
navigator.javaEnabled( )
navigator.cookieEnabled
document.cookie
decodeURIComponent(document.cookie.spl it(";"))
localstorage
Screen properties screen.width
screen.height
document.width
document.height
innerWidth
innerHeight
screen.availwidth
screen.availHeight
screen.colorDepth
screen.pixelDepth
Location properties position.coords.latitude
position.coords.longitude
position.coords.accuracy
position.coords.altitude
position.coords.altitudeAccuracy
position.coords.heading
position.coords.speed
position.timestamp The server 201 may use unique combinations of the above properties to uniquely identify electronic display systems 100.

Furthermore, location and date properties may be employed to determine the when the image data files 208 were displayed and at which locations.

Furthermore, the screen properties may be logged into determine parameters of the digital display device 116 upon which the image data files 208 are displayed.

The process of data transmission and logging at step 407 and 408 may repeat while the image data file 208 is displayed on the digital display device 116. When the display controller 111 moves to the next image 108 at step 409, the rendering of the hypertext marked-up image display data file 209 is destroyed and therefore the data transmissions cease.

Figure 5:
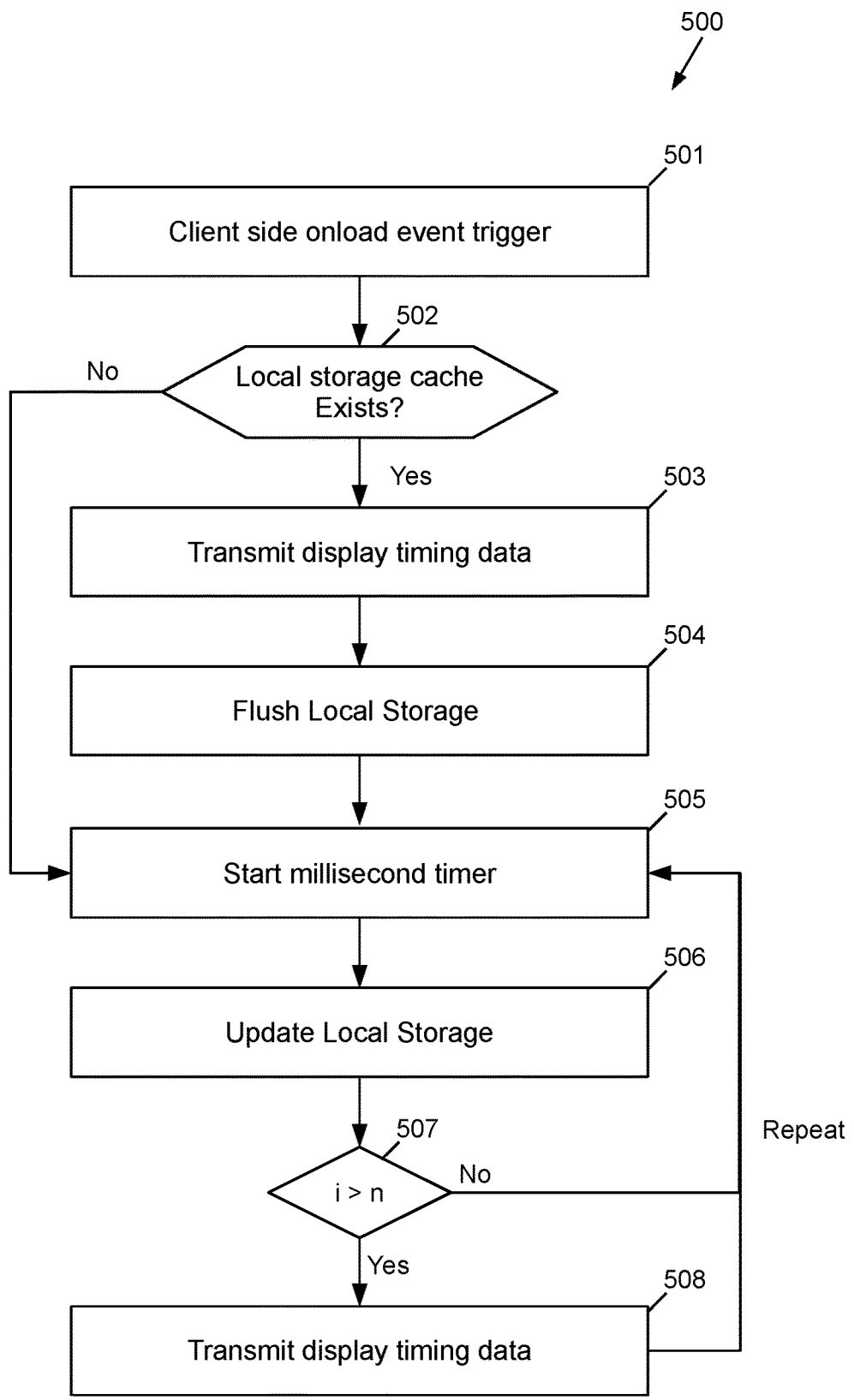
FIG. 5 illustrates a technique for sub millisecond display timing resolution in accordance with an embodiment.

FIG. 5 illustrates the process 500 for obtaining sub-millisecond resolution display data.

The processing 500 comprises the load event handler 303 loading at step 501 and starting a millisecond timer 304 at step 505. At each millisecond or millisecond periods, the client-side code 211 updates local storage 506 which may be cookie or HTML 5 local storage.

At each n millisecond intervals at step 507, the transmitter 305 may transmit the display timing data 508 to the server 201 such that the process repeats.

If the rendering of the hypertext markup display data file 209 is destroyed prior the transmission at step 508, the millisecond timing increments persist within local storage such that at the next on-load event, the client-side code 211 is able to check whether millisecond timing exists within local storage at step 502 wherein, if it does, the transmitter 305 may transmit the display timing data 503 to the server 201 after which the local storage is flushed at step 504.

To reduce the number of data transmissions or the network delay of having two data transmissions transmitting both the prior timing cache and the next periodic data transmission, the client-side code 213 may add the previous timing data to the first periodic data transmission. For example, if the client-side code 213 is configured for transmitting data every second and cache remaining from a previous session indicates that an image was displayed for 417 milliseconds, the resource request transmitted by the transmitter 305 to the server 201 may include a GET or POST timing data field of 1417 milliseconds.

Figure 6:
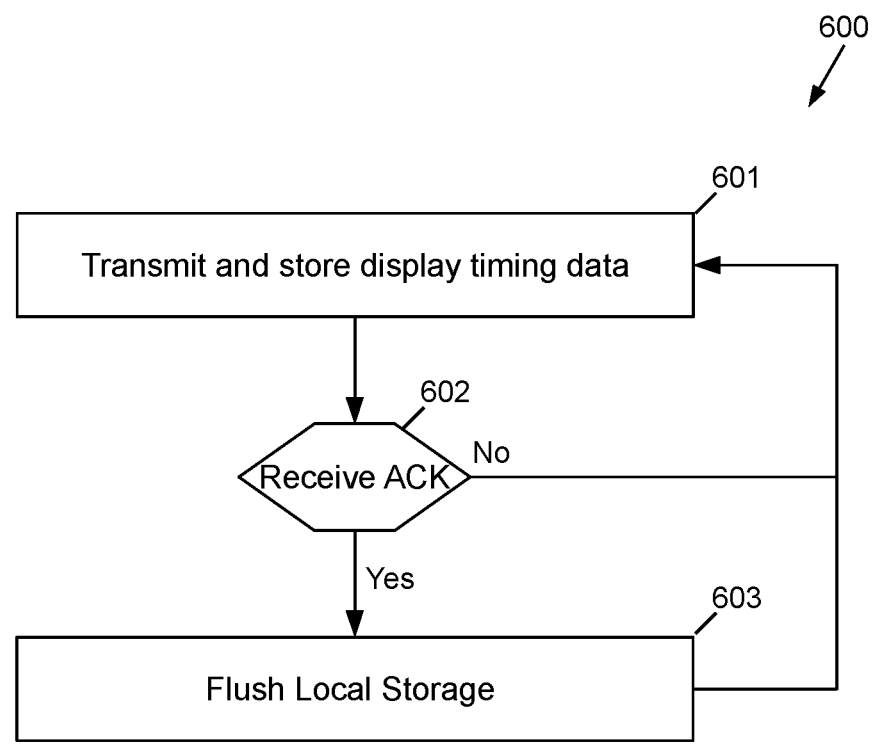
FIG. 6 illustrates a technique for network data loss mitigation in accordance with an embodiment.

FIG. 6 illustrates exemplary processing 600 to address data loss in transmission.

According to the processing 600, the client-side code 211 may be configured to transmit display timing data using the transmitter 405 at step 601 and simultaneously store or increment timing data within local storage.

At step 602, if the client-side code 211 receives an acknowledgment from the server 602 in response to the asynchronous data transmission, the client-side code 2011 may flush the local storage at step 603.

In this way, if no acknowledgment is received at step 602, the client-side code may resend the timing data at the next transmission.

In embodiments, the rendering of the hypertext markup display data file 209 may be destroyed before the client-side code is able to receive the acknowledgment from the server 201. As such, each data transmission may be uniquely identified, such as by way of an incremental counter. As such, if the server 201 receives a duplicate data transmission, the server 201 is able to discard the duplicative timing data transmission.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A method of obtaining proof-of-play data from an electronic display system comprising a processor and a digital display device and memory device operably coupled thereto, the method comprising:
   receiving a hypertext marked-up image display data file for storage by the electronic display system in the memory device amongst image data files, the hypertext marked-up image display data file comprising image data, hypertext markup, client-side code and a resource locator;
   loading, via a display controller, the hypertext marked-up image display data file from the memory device for display thereof on the digital display device, the display controller including a hypertext processor and a client-side code interpreter;
   interpreting, by the client-side code interpreter of the display controller, the client-side code to periodically transmit
   proof-of-play data to a resource across a wide area network specified by the resource locator, wherein each hypertext marked-up image display data file includes a unique resource locator for tracking an amount of time the image data for each hypertext marked-up image display data file is displayed on the digital display device;
   determining an amount of time the image data is displayed on the digital display device based on a start of the periodic transmitting of the proof-of-play data and a termination of the periodic transmitting of the proof-of-play data.

2. The method in claim 1, wherein the client-side code includes an on-load event handler for handling an on-load event fired by the interpreter and an asynchronous data transmitter and wherein the on-load event handler invokes the asynchronous data transmitter when handling the on-load event.

3. The method in claim 2, wherein the client-side code further comprises a timer and which invokes the asynchronous data transmitter at a periodic interval.

4. The method in claim 3, wherein the periodic interval is between 800 ms and 1200 ms.

5. The method in claim 1, wherein the hypertext markup includes an image element referencing the image data and wherein the hypertext marked up data file further comprises styling for configuring at least one of the display location, display sizing and display orientation of the image element.

6. The method in claim 1, wherein the client-side code is configured for transmitting an image ID of the image data.

7. The method in claim 1, wherein the client-side code is configured for file hashing the image data to obtain a unique hash thereof and transmitting the hash.

8. The method in claim 7, wherein the file hashing comprises MD5 hashing.

9. The method in claim 1, wherein the client-side code is further configured for obtaining and transmitting timestamp data.

10. The method in claim 1, wherein the client-side code is further configured for obtaining and transmitting time zone properties including a time zone offset.

11. The method in claim 1, wherein the client-side code is configured for obtaining and transmitting browser properties.

12. The method in claim 1, wherein the client-side code is configured for obtaining screen properties of the digital display device and transmitting the screen properties.

13. The method in claim 12, wherein the screen properties comprise at least one of screen width, screen height, document width and document height.

14. The method in claim 1, wherein the client-side code is configured for obtaining and transmitting location properties.

15. The method in claim 1, wherein the timer is a sub second resolution timer and wherein the client-side code is configured to record sub second timing data at a sub second timing interval within local storage of the display controller.

16. The method in claim 15, wherein local storage comprises at least one of cookie and HTML 5 local storage.

17. The method in claim 15, wherein, at a further timing interval greater than the sub second timing interval, the client-side code is configured for transmitting timing data obtained from the local storage of the display controller.

18. The method in claim 15, wherein the client-side code includes an on-load event handler for handling an on-load event fired by the interpreter and wherein, when handling the on-load event, the client-side code is configured for inspecting local storage of the display controller for prior session timing data.

19. The method in claim 18, wherein, if prior session timing data is located within local storage, the client-side code is configured for transmitting the prior session timing data.

20. The method in claim 19, wherein transmitting the prior session timing data comprises generating a transmission therefor.

21. The method in claim 19, wherein transmitting the prior session data comprises adding the prior session timing data to a subsequent timing transmission.

22. The method in claim 1, wherein the client-side code is configured for storing timing data within local storage of the display controller and wherein, when the client-side code is configured for receiving a transmission acknowledgement and clearing the timing data from local storage in response to receiving the transmission acknowledgement.

\* \* \* \* \*